US006961061B1

(12) United States Patent
Johnson et al.

(10) Patent No.: US 6,961,061 B1
(45) Date of Patent: Nov. 1, 2005

(54) FORECAST WEATHER VIDEO PRESENTATION SYSTEM AND METHOD

(75) Inventors: Chad W. Johnson, Cross Plains, WI (US); John S. Moore, Middleton, WI (US)

(73) Assignee: Weather Central, Inc., Madison, WI (US)

( * ) Notice: Subject to any disclaimer, the term of this patent is extended or adjusted under 35 U.S.C. 154(b) by 295 days.

(21) Appl. No.: 10/126,446

(22) Filed: Apr. 19, 2002

(51) Int. Cl.[7] .............................................. G06T 13/00

(52) U.S. Cl. ........................... 345/473; 702/3; 345/634

(58) Field of Search ................................ 345/473–475, 345/419, 421, 422, 426, 427, 428, 629, 630, 345/631, 632, 633, 634; 348/584, 586; 702/3, 702/4

(56) References Cited

U.S. PATENT DOCUMENTS

| | | | | |
|---|---|---|---|---|
| 6,335,765 | B1 * | 1/2002 | Daly et al. .................. | 348/586 |
| 6,496,780 | B1 * | 12/2002 | Harris et al. ................... | 702/3 |

* cited by examiner

*Primary Examiner*—Mark Zimmerman
*Assistant Examiner*—Enrique L. Santiago
(74) *Attorney, Agent, or Firm*—Reinhart Boerner Van Deuren s.c.

(57) ABSTRACT

A system and method for generating a realistic weather forecast visualization. Realistic weather graphics and animations are combined with a view of a location of interest to allow weather presentation viewers to visualize future forecast weather conditions as they would actually be seen. A forecast weather video presentation may be formed by selecting and combining pre-rendered or pre-recorded video segments based on user selected time period and location parameters and model generated forecast weather data.

20 Claims, 6 Drawing Sheets

FORECAST WEATHER VIDEO PRESENTATION SYSTEM AND METHOD

FIELD OF THE INVENTION

The present invention pertains generally to systems and methods for preparing presentations, e.g., for broadcast, of current and future weather conditions.

BACKGROUND OF THE INVENTION

Modern televised weather reports incorporate computer generated graphical information in combination with video segments and live presenters to provide weather reports which are both informative and entertaining. Such reports are typically prepared by a meteorologist or other technician based upon weather information provided from a variety of weather information sources, including forecast data from weather forecasting models. Computer based production equipment is employed for generating graphical displays of weather information and for combining the graphical displays with video segments to provide the entire weather report presentation.

Computer-based systems, including detailed computerized geographic maps, and other graphics generating capabilities, may be employed to combine the information provided from various weather information sources and forecast models into an integrated weather report. Computer-generated graphics are often combined with live presenters and/or live or recorded video segments to provide a complete weather presentation to a viewer as part of a televised weather report. For example, such a presentation may include live video of current weather conditions or recorded video segments of weather conditions occurring during the day for which the weather report is provided.

Video segments of past and current weather conditions employed as part of a televised weather presentation may include time-lapsed photography video presentations. For example, a video camera may be positioned to take a video image of the sky conditions evolving throughout a day or other time period of interest (e.g., taken near a landmark which would be recognized by viewers of the weather presentation). The video camera may be computer controlled to take frames of video images at spaced apart time intervals throughout the time period of interest. When the time-lapsed video created in this manner is played back at normal speed, a sped-up video image of the evolving sky conditions is presented. Using time-lapsed photography in this manner, a televised weather report may present a dramatic video summary of evolving sky conditions throughout an entire day with a video segment running only a few seconds.

Forecasts of future weather conditions for a location are typically provided as part of a weather presentation using a relatively simple graphical and textual presentation format. For example, future weather conditions are often presented using a simple graphical presentation format showing a time-line of future time periods with high and/or low temperatures and a graphical indication of general sky conditions for those time periods indicated thereon. Such a presentation may include a computer generated graphic illustration of a sun, if the forecast sky conditions are sunny, clouds, if the forecast sky conditions are cloudy, rain and lightening, if thunderstorms are predicted, etc. Such sky condition graphics and forecast high/low temperatures may be overlaid on a map display, thereby allowing forecast sky conditions and temperatures for a given time period to be presented simultaneously for various locations throughout a region.

Although such relatively simple presentations of future forecast weather conditions are typically clear, accurate, and easily understandable, such simple presentations are not very dramatic or memorable. What is desired, therefore, is a system and method for generating a presentation of future forecast weather conditions which conveys more dramatically to viewers thereof the weather conditions they are likely to experience in the future. Such a system and method should be easily employed by meteorologists or other technicians to generate quickly dramatic forecast weather presentations based on available weather forecast data.

SUMMARY OF THE INVENTION

The present invention provides a system and method for combining forecast weather condition data with pre-rendered or stored video images to generate a dramatic forecast weather video presentation for use, e.g., as part of a broadcast weather report. Forecast weather condition information may be provided for a selected location and time period of interest by a forecast weather model. A graphics/video database includes pre-recorded or computer generated video images of locations of interest sky conditions, precipitation, fog, etc. Based on the selected location of interest, time period of interest, and the forecast conditions for that location and time period, selected ones of the pre-recorded/generated video segments are selected and combined to generate a combined forecast weather video presentation. The combined forecast weather video presentation provides a dramatic dynamic video presentation of forecast weather conditions which a viewer is predicted to experience for the selected location as that viewer might actually see those conditions. A forecast weather video presentation in accordance with the present invention may be generated rapidly, easily, and mostly automatically by a meteorologist or weather technician. The meteorologist or technician may preferably also be able manually to select or change the predicted weather conditions upon which the generated forecast weather video presentation is based.

A production system for generating a forecast weather video presentation in accordance with the present invention may be implemented using one or more conventional computer processors. Weather forecast model data is either provided to, accessible by, or generated by the system. The system preferably includes or has access to a graphics/video database. The graphics/video database includes pre-recorded or pre-rendered video segments. For example, the graphics/video database may include pre-recorded still or video images of various location views, e.g., a city skyline, sports venue, a well known landmark, a rural scene, etc. Each such location view preferably includes a significant portion of which that is sky. Pre-recorded or computer rendered video segments of weather conditions, e.g., sky conditions, such as clouds moving across the sky, computer generated or recorded images of precipitation, fog, etc, preferably are also included in the graphics/video database. Pre-recorded or computer generated video images of various other weather or non-weather related conditions or events may also be included in the graphics/video database.

Based on forecast weather conditions, e.g., obtained from the forecast weather model for the location and time period selected, the system selects automatically appropriate graphics/video segments from the graphics/video database which are to be combined into a combined forecast weather video presentation. The combined forecast weather video presentation provides to the viewer thereof a realistic visualization of the forecast weather conditions for a location as they might actually be seen by a viewer at that location. For example, the forecast weather video presentation may show a familiar city skyline or other landmark with clouds moving through the sky (if clouds are predicted) behind the image of the city or landmark, and with rain, snow, fog, or other precipitation (if such is predicted) falling in the viewer's line of sight in front of the image of the city or landmark. Computer generated graphical and/or textual information indicating, e.g., the time of the forecast being displayed, high/low temperatures, or other information, may also be overlaid on the forecast weather video presentation display.

A forecast weather video presentation in accordance with the present invention may be generated from multiple video segment layers. The multiple video segment layers forming a given forecast weather video presentation preferably are selected automatically based on the location, time, and forecast weather conditions for the selected location and time. The selected video layers may be combined using a conventional video rendering process. The various video segments from which the layers of the forecast weather video presentation are formed preferably are pre-processed and stored in the graphics/video database so that they are easily found and recovered therefrom, and have characteristics appropriate for the video segment layer which they are to contribute to the combined forecast weather video presentation.

Exemplary video segment layers from which the combined forecast weather video presentation may be generated include a background cloud layer, a location view layer, a precipitation layer, and a fog layer. The background cloud layer video segment is selected based on the forecasted sky conditions for the given location and time. It may show, for example, moving clouds, a clear sky (if no clouds are forecast) or other weather conditions.

The location view layer appears in front of the background cloud layer. The location view layer includes a video segment of a known location or landmark, such as a city skyline, for a given time of day. For example, for the appropriate lighting effect to be presented, different video segments for the same location and view may be selected depending upon whether the forecasted time period is during the night or day. The location view layer video segments are pre-processed, or otherwise generated, such that a sky area appearing behind the structures in the location view layer video segments are rendered transparent when combined with the background cloud layer. Thus, clouds and other weather phenomena objects in the background cloud layer appear in the sky behind the structures or other objects in the location view layer.

The precipitation and fog video segment layers are rendered in front of the location view layer. For example, the precipitation layer video segment may include computer rendered images of falling precipitation (rain or snow). The precipitation layer video segment is rendered transparent except where falling precipitation appears. Thus, the precipitation layer video segment, when combined with the location view and background cloud layer video segment results in the appearance of precipitation falling in front of the structures shown in the location view layer video segment and the background weather from the background cloud layer.

The fog layer video segment may preferably be computer rendered to include a layer of fog having a given transparency value. When combined with the location view and other video layer segments, the fog video segment layer appears as fog which partially (but not entirely, depending on the fog density) obscures the view of objects and other layers behind the fog layer in the location view layer.

Additional operator selectable insert video segment layers may also be provided. For example, a background insert layer video segment may be selected to appear between the background cloud layer and the location view layer. Such a background insert layer video segment may be used to show meteorological phenomenon (e.g., lightening) or non-meteorological phenomenon (e.g., fireworks) in the sky behind the structures shown in the location view layer but in front of the sky conditions shown in the background cloud layer. A similar user selectable foreground insert layer video segment may be selected to include in the forecast weather video presentation objects which are to appear in front of the location view layer but behind the precipitation shown in the precipitation layer video segment in the combined forecast weather video presentation.

A method for generating a forecast weather video presentation in accordance with the present invention begins with selecting a location and time period for the presentation. From the location and time period selected, a weather forecast for the selected location and time period is obtained. The weather forecast may be generated using a weather forecasting model, to which the selected location and time period are provided. From the forecast weather conditions obtained for a selected location and time period, specific parameters which are used to select the video segments which will appear in the forecast weather video presentation are selected or derived. Such parameters may include, for example, forecast high and low temperatures, forecast sky conditions (clouds), forecast precipitation (type and intensity), wind (direction and intensity), fog, etc. The operator may also select a particular view of the location which will be presented in the forecast weather video presentation and, if desired, background and/or foreground insert video segments. Based on the derived forecast parameters and operator selections, appropriate video segments are selected from the graphics/video database and are combined, preferably automatically, to generate a combined forecast weather video presentation in accordance with the present invention.

The resulting forecast weather video presentation is preferably presented on an operator display to a meteorologist or technician for review. If the resulting forecast weather video presentation is acceptable, it may be broadcast directly to viewers, or otherwise saved and combined into a weather report presentation to be provided at a later time. If the forecast weather video presentation generated automatically from, e.g., weather forecast modeling data, it is not acceptable to the meteorologist or technician, he may manually override or select selected ones of the forecast parameters used to select the video segments which will be included in the combined forecast weather video presentation. The meteorologist or technician operator thus, may effectively manually determine the weather related video segments which are to be incorporated into the forecast weather video presentation in accordance with the present invention.

Further objects, features, and advantages of the invention will be apparent from the following detailed description taken in conjunction with the accompanying drawings.

DETAILED DESCRIPTION OF THE INVENTION

Figure 1:
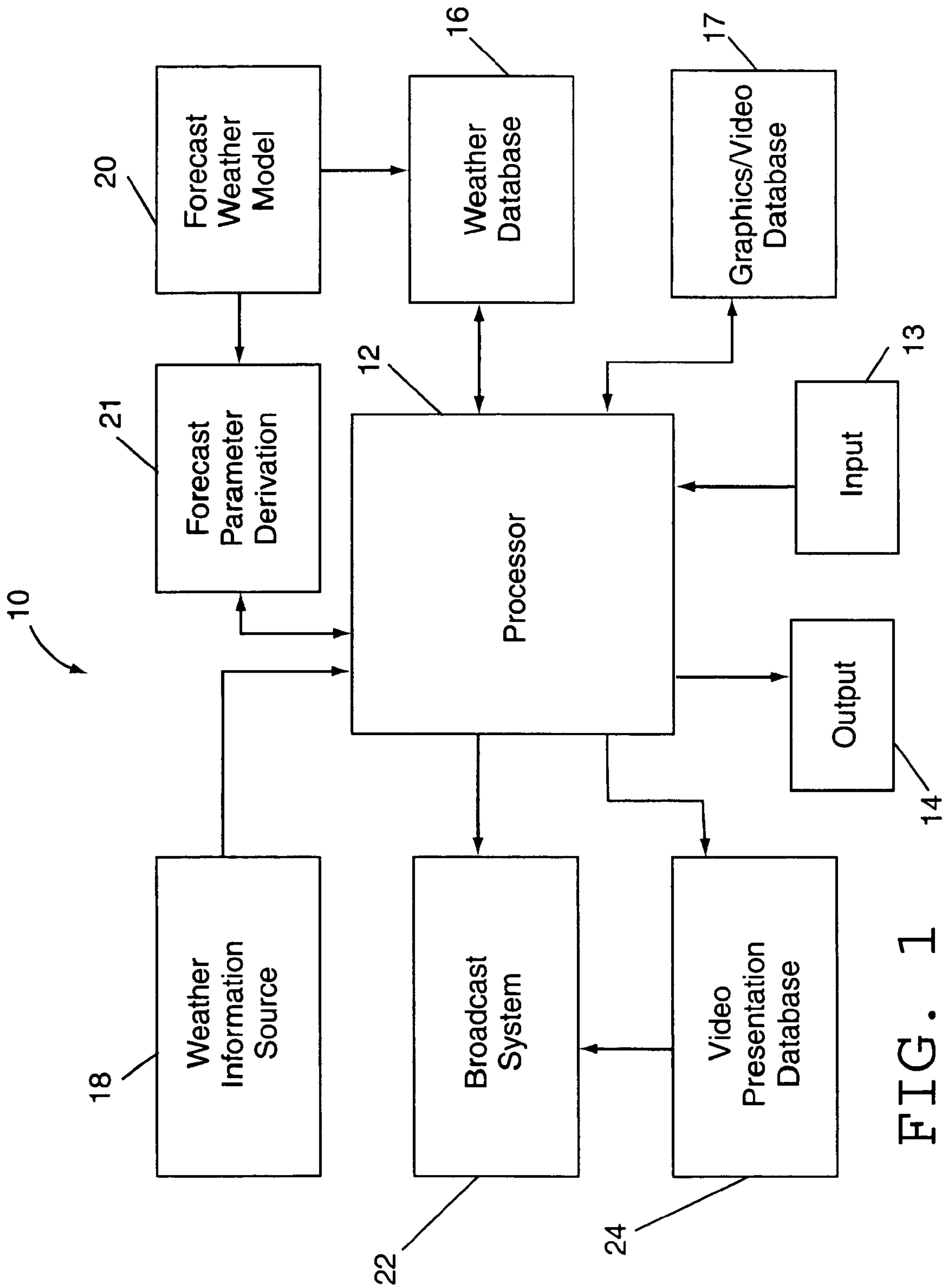
FIG. 1 is a schematic block diagram of an exemplary system for generating a forecast weather video presentation in accordance with the present invention.

An exemplary production system 10 which may be used for generating a forecast weather video presentation in accordance with the present invention is illustrated in the schematic block diagram of FIG. 1, and will be described in detail with reference thereto. The production system 10 for generating a forecast weather video presentation in accordance with the present invention may preferably be implemented substantially in software procedures 110 running on one or more conventional system computer processors 12. The system processor 12 may have associated therewith conventional input devices 13, e.g., a keyboard, mouse, etc., for providing operator input to the processor 12 to control the operation of the system 10. One or more conventional output devices 14, such as monitors, printers, etc., may also be associated with the system processor 12. Conventional memory associated with the system processor 12 may be used to store the programming instructions which control operation of the processor 12, such as the programming instructions for implementing a method for generating a forecast weather video presentation in accordance with the present invention. Such memory may be employed to store a database 16 of recorded actual and/or predicted forecast weather condition information and a database 17 of pre-recorded or computer generated video image sequences, as will be discussed in more detail below. Note that memory for storing the weather database 16, graphics/video database 17, and programming instructions for the processor 12 may be implemented in the same or a plurality of separate memory devices, in a conventional manner.

Weather information may be provided to the system 10 from a variety of weather information sources 18. Such sources may include, for example, weather stations, weather radar, and weather satellite imagery sources. Weather station sources of weather information provide current weather condition information for a particular local or remote location of interest to the system 10. Such weather information may include, for example, current temperature, wind speed and direction, and accumulated precipitation weather information, etc. Such information may be provided from the weather station to the system 10 manually, such as by manual visual observation of various weather station instruments with subsequent manual inputting of weather condition information to the system 10, or automatically. A conventional automatic weather station may be employed to provide weather information automatically to the system 10. Weather radar information sources may include highly detailed NEXRAD weather radar information provided by the government, and/or information from local weather radar, which may be updated more rapidly, but which includes less detailed weather information than NEXRAD. Satellite weather information sources may provide weather condition imagery to the system 10. Data transfer formats for receiving weather information from weather stations, weather radar sources, and weather satellite sources, by the system 10 may be obtained from the manufacturers of automatic weather stations and weather radars, and from the providers of radar and weather satellite weather information. Weather information received by the system 10 from the various weather information sources 18 may be stored by the system processor 12 in the weather database 16.

Weather information sources 18 provide information on past and current weather conditions to the system 10. The system processor 12 preferably also obtains forecast weather condition data from a forecast weather model 20. The forecast weather model 20 may be implemented within the system 10, e.g., in the system processor 12, or separately from the system 10 and/or processor 12. If the forecast weather model 20 is implemented in the system 10 or processor 12, weather model initialization information may need to be provided to the model. Such initialization information may be based on current weather condition information, e.g., from one or more weather information sources 18. Forecast weather condition information may be provided to the system 10 and the processor 12 from a weather forecast model which is run separate from or external to the system 10. In such case, the system processor 12 may provide to the forecast weather model 20 the location and time period for which forecast weather conditions are required. An exemplary weather forecasting model 20 which may be employed to generate detail and high resolution weather forecast information is the commercially available A.D.O.N.I.S. FutureCast or A.D.O.N.I.S. MicroCast weather forecast modeling products available from Weather Central, Inc., of Madison, Wis. Other known weather forecast models as sources of modeled weather forecast date may also be used. Forecast weather information may also be provided to the system 10 manually, e.g., by a meteorologist employing the system processor input device 13 to enter forecast weather information to the system 10. Weather forecast information of any form or source may be stored in the weather database 16 for use in accordance with the present invention. Weather forecast parameters may be derived from the weather forecast model output by a forecast parameter derivation function 21 which may be implemented separate from or within the processor 12. The derived forecast parameters are used in selecting the video components of a forecast weather video presentation in accordance with the present invention in the manner described in more detail below.

The production system 10 may preferably be coupled to a conventional television broadcast system 22. A forecast weather video presentation generated by the system 10 in accordance with the present invention may be provided directly to the broadcast system 22 for broadcast, e.g., as part of a televised weather presentation. Alternatively, a forecast weather video presentation generated by the system 10 in accordance with the present invention may be stored by the system 10, either internally or externally thereto, in any known analog or digital format, and/or displayed or transmitted in any other conventional format over any conventional medium. For example, the system 10 may store a forecast weather video presentation generated thereby in memory, e.g. in a video presentation database 24, from which the forecast weather video presentation may be retrieved by the broadcast system 22 for broadcast to viewers.

Figure 2:
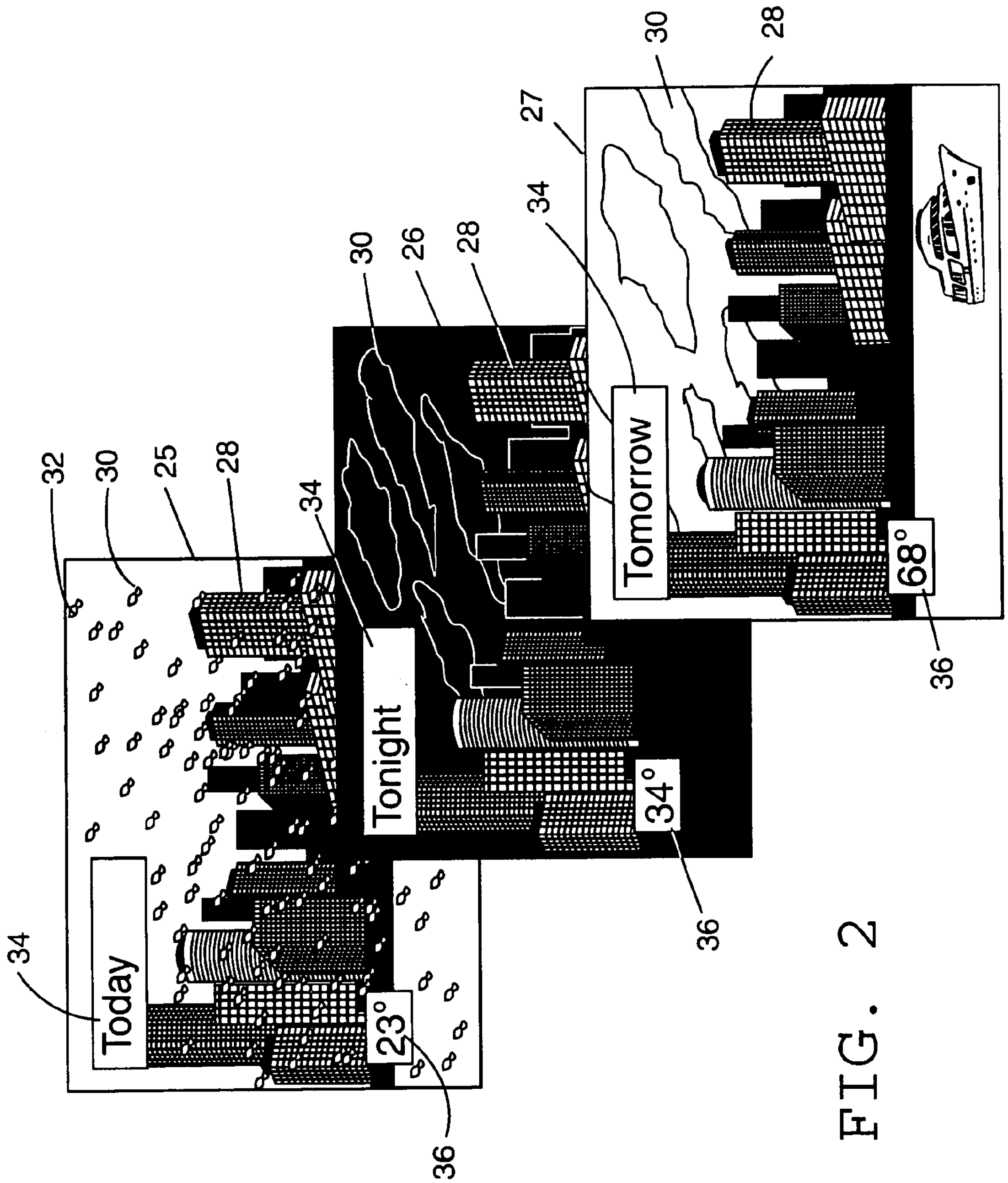
FIG. 2 shows exemplary single frames of exemplary forecast weather video presentations which may be generated in accordance with the present invention.

Single frames of three exemplary forecast weather video presentations 25, 26, 27 generated in accordance with the present invention are illustrated in FIG. 2. Each exemplary forecast weather video presentation 25–27 shows a view of a location 28, which may be selected so as to be recognizable by local viewers of the presentations 25–27. For example, as illustrated, the location view 28 may be a city skyline. Any other conceivable location view may also be employed, such as rural landscapes, recognizable landmarks, sports arenas, or other location views. Note that the location view 28 is appropriate for the time of day presented in the forecast weather video presentation. Thus, for a forecast weather video presentation showing weather conditions during daylight 25, 27, the location view 28 is shown in daylight conditions. For a forecast weather video presentation showing forecast weather conditions at night 26, a night-time view 28 of the location is used.

Dynamic sky conditions 30 are shown in the sky behind the shown location view. The dynamic sky conditions shown are based on the forecast weather conditions for the displayed location and time. For example, if cloudy conditions are forecast for the selected location and time, the dynamic image 30 appearing in the sky may include clouds moving through the displayed scene. If precipitation is forecast for the selected time and location displayed, a realistic dynamic representation of such precipitation is also preferably shown in the forecast weather video presentation. For example, for the location and time period represented by the top exemplary forecast weather video presentation 25 shown in FIG. 2 snow was forecast. Therefore, falling snow 32 is shown in the forecast weather video presentation 25. Note that the falling precipitation (in this case snow 32) is shown falling in front of the view of the selected location. Thus, a forecast weather video presentation in accordance with the present invention provides a realistic animated view of the forecast weather conditions for a given location as they might actually be seen by someone viewing the location at the time for which the forecast was generated.

Additional graphical and/or alpha-numerical information may be overlaid on a forecast weather video presentation in accordance with the present invention. Such additional information may include an indication of the time period for which the forecast weather video presentation is being displayed. For example, such an indication may be implemented simply as a computer generated textual or graphical label 34 indicating, e.g., the day and time of day which is being represented. Alternatively, a graphical representation of a clock or other image display may be used to indicate the time period being represented. Other weather related information, such as, e.g., the high or low temperature 36 forecast for the period represented in the forecast weather video presentation 25–27 may be displayed as a graphical or textual overlay on the forecast weather video presentation 25–27. Other weather related (e.g., forecast wind speed, wind direction, etc.) or non-weather related graphical or textual information may be generated in a conventional manner and overlaid on a forecast weather video presentation in accordance with the present invention to enhance the usefulness of the presentation to viewers.

Figure 3:
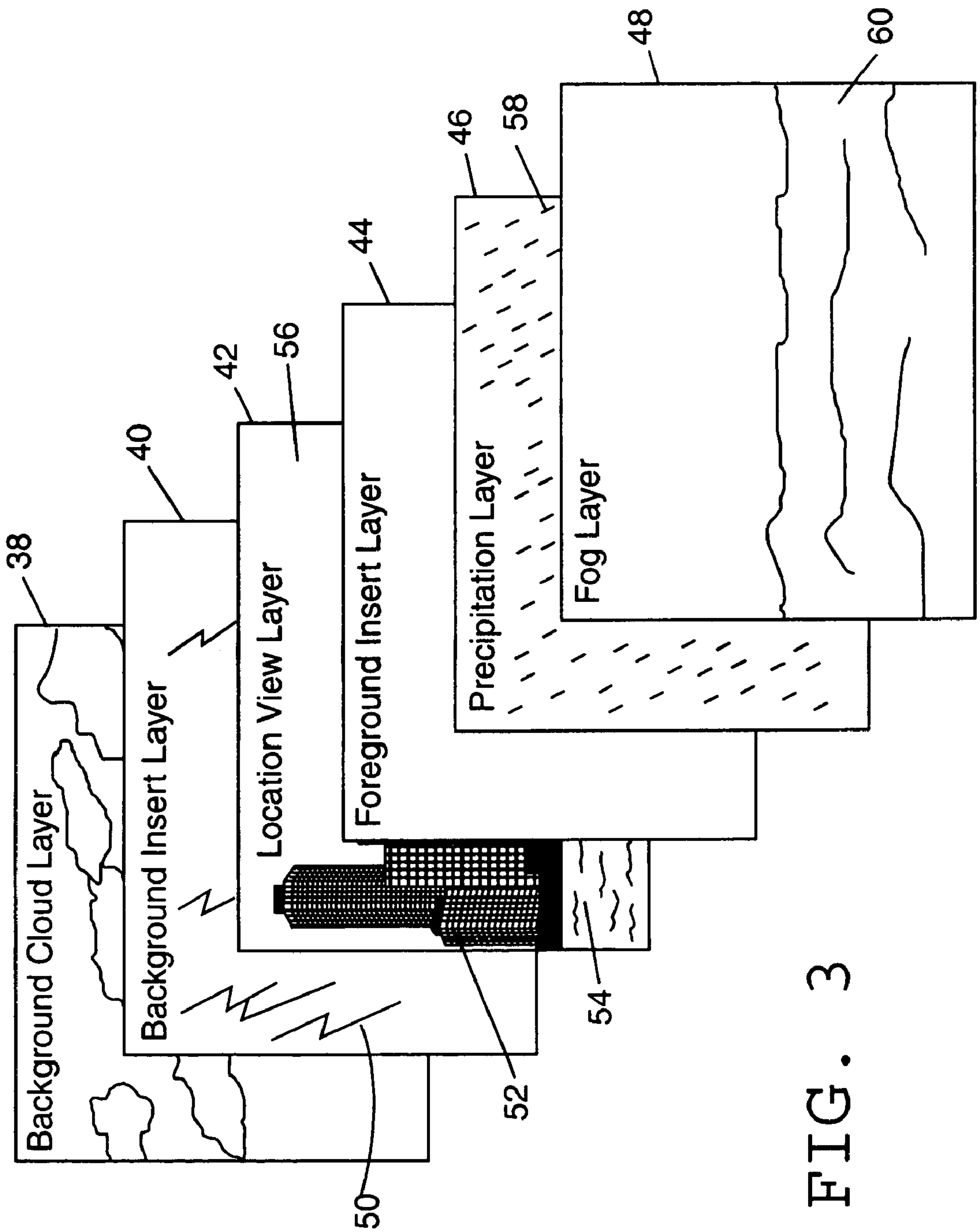
FIG. 3 is an exemplary schematic illustration of the relationship between various video segment layers which may be combined to form a forecast weather video presentation in accordance with the present invention.

As illustrated conceptually in FIG. 3, a forecast weather video presentation in accordance with the present invention may be generated from multiple video segments which are combined in a layering concept to generate the forecast weather video presentation. Six exemplary video segment layers are illustrated in FIG. 3, and will be described with reference thereto. It should be understood, however, that more or fewer video segment layers may be employed to generate a forecast weather video presentation in accordance with the present invention. The exemplary video segment layers to be described include: a background cloud layer 38, a background insert layer 40, a location view layer 42, a foreground insert layer 44, a precipitation layer 46, and a fog layer 48.

The background cloud video segment layer 38 is a video segment showing the sky conditions which are to appear in the forecast weather video presentation. An appropriate video segment for the background cloud layer may be selected depending upon the time of day which is to be represented in the forecast weather video presentation and the forecast weather conditions to be presented. For example, an appropriate cloud layer video segment may be selected based upon forecast cloud level (clear, low, medium, high), cloud type (clear, cumulus, stratus), sky condition (clear, overcast, few, scattered, broken), and whether thunderstorms or severe thunderstorms are forecast. Another variable which may be considered in selecting the background cloud layer video segment is forecast wind conditions for the location and time period to be presented. For example, cloud movement direction and speed as presented in the background cloud layer video segment may depend on the forecast wind conditions. Video segments for the background cloud layer may be generated from photographic video segments of actual historical sky condition. Alternatively, computer generated clouds and other sky conditions may be used to generate the background cloud layer video segments.

The background insert video segment layer 40 includes video segments of selected objects which are to appear in front of the sky conditions shown in the background cloud layer 38 but behind the objects presented in the other video segment layers to be described. Included in the background insert video segment layer may be meteorological phenomena, such as lightening 50, or non-meteorological phenomenon (e.g., fireworks). Videos for the background insert video segment layer may preferably be computer generated, but may also include photographically recorded elements.

The location view video segment layer 42 includes a video segment of a selected view of a selected location. As discussed above, the location view layer may include views of structures (e.g., city skyline, landmarks, stadium, rural scene), which are recognizable to viewers of the forecast weather video presentation. The location view video segment layer selected to be included in the forecast weather video presentation may be selected based upon the particular location view selected as well as the time of day to be represented in the forecast weather video presentation and the forecast sky conditions (e.g., clear, overcast, few clouds, scattered clouds, broken clouds) for the selected location and time period. The time of day and sky condition information are used to select the location view video segment layer having the appropriate lighting conditions corresponding to the time of day and forecast weather conditions.

Video segments for the location view video segment layer 42 may be generated from video segments or still photographs of the location view represented in the location view video segment layer. Alternatively, the location view video segment layer, or portions thereof, may be computer generated. For example, location view video segment for a particular location view under various lighting conditions may be generated from a single still image using commercially available photographic processing software (e.g., Microsoft Photoshop) to colorize, highlight, and to add appropriate lighting conditions to the photographic image to generate the various location view video segment therefrom.

Forecast wind conditions may also be considered in selecting the location view video segment layer. For example, if windy conditions are forecast, a location view video segment layer showing objects being blown by the wind may be selected. Also, such windy conditions may be indicated by rough water appearing in any body of water 54 appearing in the location view video segment layer.

Forecast sky conditions may also be reflected in any such body of water 54. Showing the appropriate water conditions for a body of water 54 appearing in a location view video segment layer may be accomplished by using conventional computer animation techniques to generate location view 111 video segment for water conditions under various different wind and weather condition combinations. (Note that different body of water conditions 54 may be presented in the forecast weather video presentation in accordance with the present invention by using a separate body of water video segment layer, which may be selected based on such conditions as time of day, wind, and sky conditions. Such an additional video segment layer would be combined with the other video segment layers selected for the forecast weather video presentation to appear in a water area in front of the location view video segment layer.)

Note that in generating the location view video segment, either from photographic or computer generated images, the portion 56 of the location view video segment representing sky should be transparent. Other elements in the location view video segment may be rendered opaque. Thus, objects in the background cloud and background insert layers will only appear in the sky portion 56 of the location view video segment layer when combed into a forecast weather video presentation. Objects in the location view video segment layer will appear in front of any objects in the background cloud 38 and background insert 40 video segment layers. Pre-processing/rendering of the location view video segment in this manner may be accomplished in a conventional manner.

The foreground insert video segment layer 44 may include therein objects which are to appear in front of the objects appearing in the location view video segment layer 42 but behind objects in the precipitation 46 and fog 48 video segment layers. Any weather or non-weather related objects may be shown in the foreground insert video segment layer 44. Objects in the foreground insert video segment layer 44 may be entirely opaque or partially transparent, thereby allowing objects in the background cloud 38, background insert 40, and location view 42 video segment layers to appear through objects appearing in the foreground insert video segment layer 44.

The precipitation video segments 46 are preferably rendered as a transparent video segments with opaque or semi-transparent precipitation objects rendered therein. Thus, precipitation objects 58 (e.g., rain, snow, etc.) in a selected precipitation video segment layer 46 will appear in front of objects in the background cloud 38, background insert 40, location view 42, and foreground insert 44 video segment layers. The specific precipitation video segment layer 46 to be included in a forecast weather video presentation may be selected based on forecast wind and weather conditions (e.g., no precipitation, mixed precipitation, freezing rain, drizzle, light rain, moderate rain, heavy rain, flurries, light snow, moderate snow, heavy snow, blizzard, thunderstorm, heavy thunderstorm) generated for the particular location and time period to be represented in the forecast weather video presentation. Precipitation layer video segments for the various wind and weather conditions which may be represented are preferably computer generated, but may be generated or produced in any other manner.

The fog video segment layer 48 includes a semi transparent representation of fog 60. When combined with the other video segment layers in a forecast weather video presentation objects appearing in the other layers are visible through the fog layer 48 but obscured by the fog 60 represented in the fog video segment layer 48. The fog video segment layer 48 preferably is only selected to be included in the forecast weather video presentation if the weather forecast for the particular location and time period to be represented indicates that fog will occur. The fog video segment layer 48 may preferably be computer generated, or may be generated in any other manner. Different fog levels may be represented by different fog video segment layers having different densities of fog 60 represented therein.

The various video segment layers used for the background cloud 38, background insert 40, location view 42, foreground insert 44, precipitation 46, and fog 48 layers may be saved in a the graphics/video database 17 accessible by the system processor 12. The video segments preferably are pre-recorded and/or rendered in a manner so that selected video segments from each layer may be combined in any combination thereof to generate a forecast weather video presentation in accordance with the present invention, e.g., as illustrated in FIG. 2. Selected ones of the video segment layers may be pre-recorded or rendered in a time-lapse fashion, e.g., such that clouds or other objects move through the video segment more quickly than they would in real time. All of the video segments may preferably be rendered as seamless loops. This allows the video segment layers to be combined into a forecast weather video presentation of any length.

Figure 4A:
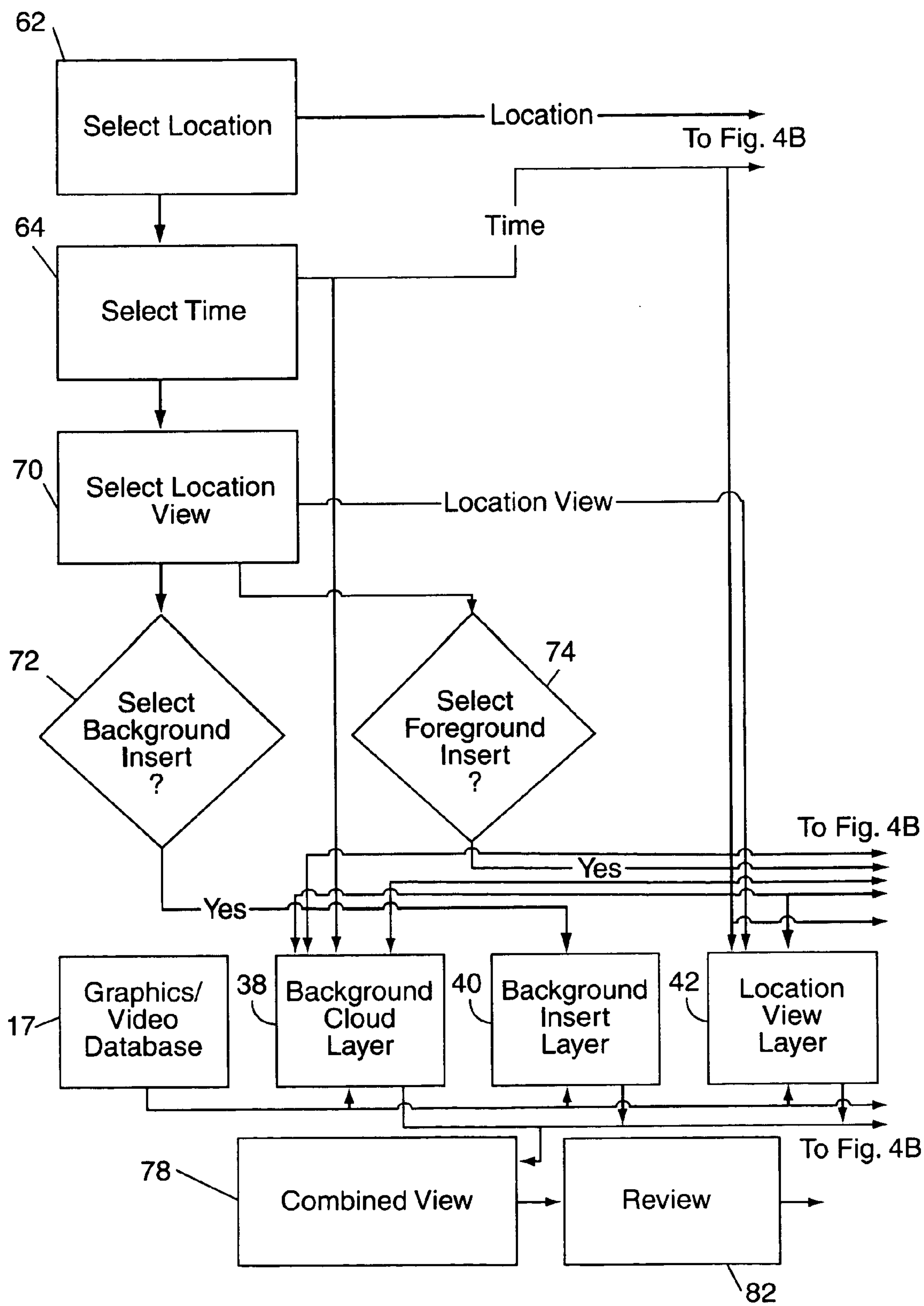
FIG. 4 is a simplified diagram of data flow in an exemplary method for generating a forecast weather video presentation in accordance with the present invention.
Figure 4B:
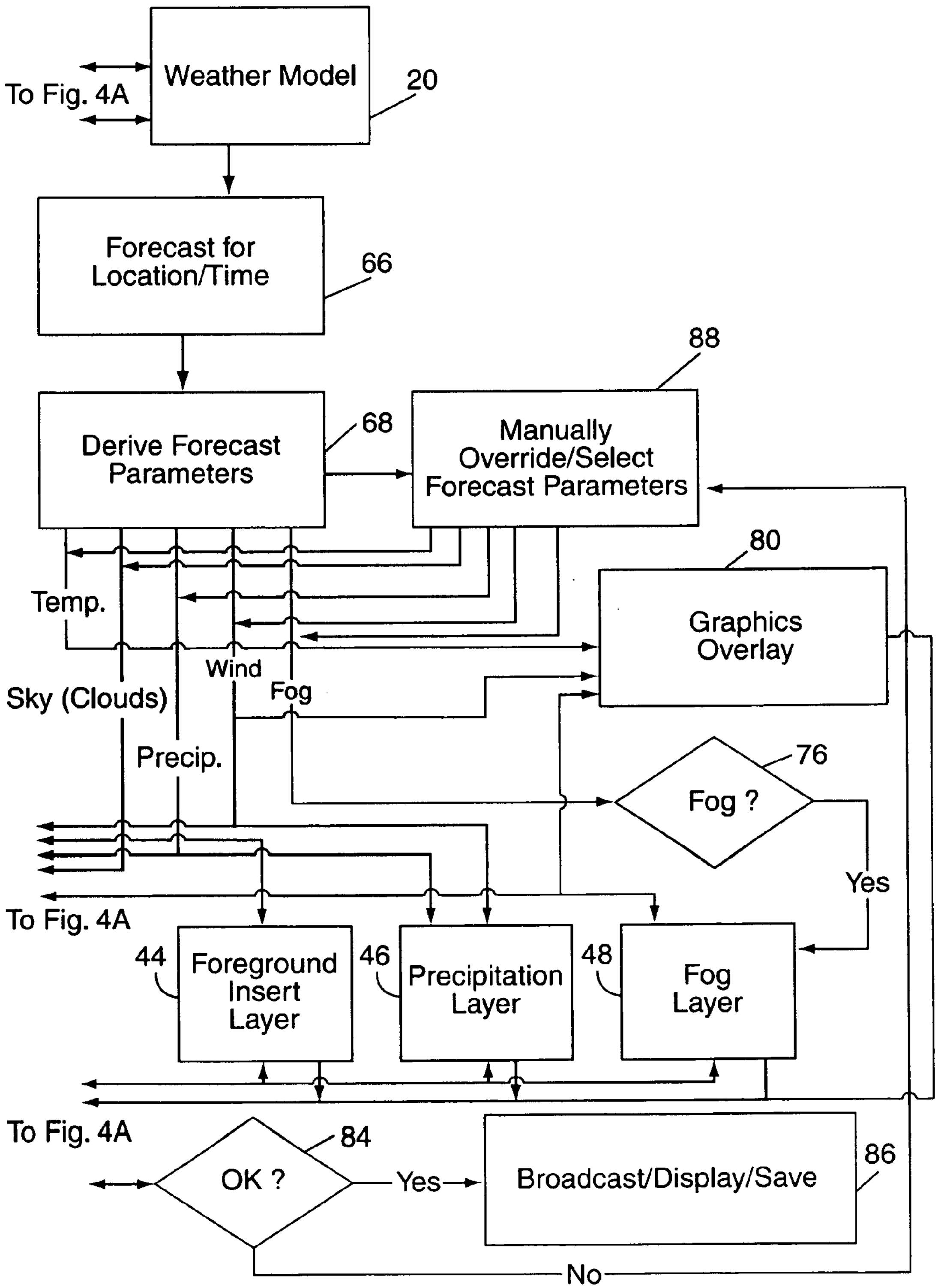

An exemplary method for generating a forecast weather video presentation in accordance with the present invention will now be described with reference to the flow chart diagram of FIG. 4. FIG. 4 illustrates an exemplary decision, selection, and data flow process for generating a forecast weather video presentation in accordance with the present invention. It should be understood, however, that variations on the method illustrated in FIG. 4 may also be employed to generate a forecast weather video presentation in accordance with the present invention. Thus, the present invention is not limited to the particular method for generating a forecast weather video presentation as will now be described in detail with reference to FIG. 4.

The exemplary procedure for generating forecast weather video presentations in accordance with the present invention begins by selecting a location 62 and time period 64 for which a forecast weather video presentation in accordance with the present invention is to be generated. The location 62 and time period 64 may be selected manually each time a forecast weather video presentation is to be generated. Alternatively, locations and time periods for forecast weather video presentations may be selected automatically, e.g., on a periodic basis. For example, a meteorologist may desire forecast weather video presentations to be generated automatically at some time each day for, e.g., the following day at a given location.

The selected location and time period are provided to a weather forecasting model 20, e.g., one of the commercially available weather forecasting models 20 discussed above. In turn, the weather forecasting model 20 generates weather forecast data 66 for the selected location and time period. Depending upon the weather forecasting model 20 employed, the forecast 66 generated by the weather model 20 may not be in a format which is easily usable to select which video segments layers are to be included in the forecast weather video presentation. Therefore, the system 10, preferably automatically derives selected weather forecast parameters 68 from the forecast data provided by the weather model 20. Such derived parameters may include, e.g., temperature (high, low, average), sky conditions (including cloud coverage, cloud level, cloud type, cloud movement direction), precipitation, wind speed and direction, and whether or not fog is predicted. The derived forecast parameters 68 are used in the manner described to select the video segments from the graphics/video database 17 which are to be combined into the forecast weather video presentation.

An exemplary procedure for deriving the forecast parameters from weather model forecast data will now be described in detail. The forecast parameters are derived using forecast grids provided by the weather forecast model employed. As discussed above, the forecast model used may be either the ADONIS or ADONIS Microcast model. Advantages of using these models are that a forecast can be generated for any location given a latitude and longitude. There is no limitation as to what location a forecast may be generated for, with the exception that the location must reside within the domain of the model. Other weather forecast models may also employed, and may provide similar forecast grid data.

The weather forecast parameters derived may include the following:

High temperature of forecast period.
Low temperature of forecast period.
Average temperature of forecast period.
Sky (Cloud) conditions of forecast period:
  Coverage.
  Level.
  Type.
  Direction.
Weather (Precipitation).
Wind direction.
Wind speed.
Fog (yes or no).
Wind (windy or calm).

High, low, and average temperatures for the forecast period may be determined from the surface temperature output grid from the selected forecast model. (Model parameters used: Temperature at Surface.)

To determining sky (cloud) conditions during the forecast period the cloud coverage may be determined at four levels in the atmosphere at each forecast interval (hour) and a weight assigned for the coverage at that layer. The amount of cloud coverage at a layer is determined by the relative humidity at that level. The weight at each layer is used later to determine a dominant cloud level coverage.

Model Parameters used:

Relative Humidity at 850 mb
Relative Humidity at 700 mb
Relative Humidity at 500 mb
Relative Humidity at 300 mb
Low level (850 mb).

| Coverage | Weight | |
|---|---|---|
| | Low level (850 mb). | |
| RH > 90% | Overcast | 10 |
| 80% > RH < 90% | Broken | 7 |
| 65% > RH < 80% | Scattered | 3 |
| RH0 < 65% | Clear | 0 |
| | Low-mid level (700 mb). | |
| RH > 85% | Overcast | 9 |
| 70% > RH < 85% | Broken | 6 |
| 55% > RH < 70% | Scattered | 2 |
| RH < 55% | Clear | 0 |
| | Mid-high level (500 mb). | |
| RH > 80% | Overcast | 7 |

-continued

| Coverage | Weight | |
|---|---|---|
| 65% > RH < 80% | Broken | 4 |
| 50% > RH < 65% | Scattered | 1 |
| RH < ##% | Clear | 0 |
| | High level (300 mb). | |
| RH > 75% | Overcast | 6 |
| 60% > RH < 75% | Broken | 3 |
| 45% > RH < 60% | Scattered | 1 |
| RH < 45% | Clear | 0 |

From the cloud coverages at the four layers, a dominant level coverage is determined. This determination answers the question: what would the sky look like to an observer? It is possible to have many visible layers of clouds of different coverages. However, by determining what the most obvious coverage would be to an observer, the number of pre-generated video segment layers prepared and stored may be somewhat reduced. If the parameters were not limited to a "dominant level coverage", the matrix describing the possibilities could results in a very large database of video segments necessary to cover every possibility.

Dominant Level:

| Level | Condition |
|---|---|
| LOW | Weight @850 mb > 0. |
| MID | Weight @700 mb > Weight @850 mb \|\| Weight @500 mb > Weight @700 mb. |
| HIGH | Weight @300 mb > Weight @500 mb. |
| CLEAR | None of the above is true. |

Dominant Type:

Model parameters used:

Lifted Index.

| Type | Dominant Level | Lifted Index |
|---|---|---|
| CLEAR | CLEAR | any |
| CUMULUS | LOW or MID | <0 |
| STRATUS | LOW or MID | >=0 |
| STRATUS | HIGH | any |

Dominant Direction:

Model Parameters used:

U and V wind components at 850 mb.
  U and V wind components at 700 mb.
  U and V wind components at 500 mb.
  U and V wind components at 300 mb.

The wind direction of the clouds at the dominant level is determined by computing the wind direction at that level in the atmosphere from the model forecast grids.

To derive a cloud forecast for the selected forecast period, the cloud attributes (coverage, level, type and direction) for the most common cloud coverage of all the forecast intervals within the period is collected. Given this collection, the cloud attributes of the lowest level make up the cloud forecast for the period.

Four cloud parameters describe the sky condition for the forecast period:

Coverage: Clear, Scattered, Broken, Overcast
Level: Clear, Low, Middle, High
Type: Clear, Stratus, Cumulus, Cumulonimbus Direction: The direction of the cloud movement (0–360 degrees)

The following forecast precipitation matters may be derived from the model forecast data:

No Precip
MIX Mix of Rain and Snow
FR Freezing Rain
DR Drizzle
LR Light Rain
MR Moderate Rain
HR Heavy Rain
HRW Heavy Rain Wind
FL Flurries
LS Light Snow
MS Moderate Snow
HS Heavy Snow
BL Blizzard
TR Thunder Shower
THR Heavy Thundershower The model parameters used to derive the precipitation parameters may include:

Snow accumulation.
Liquid (rain) accumulation.
Temperature at surface.

The model outputs a value of snow and rain precipitation amounts for each forecast time (generally at one hour intervals). The following variables are computed for the selected forecast location:

Amount

Total amount of rain or snow precipitation during the forecast period.

Duration

Percentage of time in forecast period between first occurance of precipitation and last occurrence of precipitation. $((t_1-t_n)/t)$ where $t_1$ is the time of the first occurrence of precipitation, $t_n$ is the time of the last occurrence of precipitation, and t is the total number of hours in the forecast period.

Density

Percentage of time between first occurrence of precipitation and last occurrence of precipitation that actually had precipitation. $(b/(t_1-t_0+1))$ where $t_1$ is the time of end of precipitation, to is the time of start of precipitation, and b is the number of time intervals between $t_0$ and $t_1$ containing precipitation.

The following table summarizes the precipitation forecast for the forecast period:

| Wx | Rain Amount (in) | Snow Amount (in) | Duration % | Density % | Lifted Index |
|---|---|---|---|---|---|
| MIX | >0.0 | >0.0 | 0–100 | 0–100 | |
| FR | >0.0 and Temp <= 32.0 F. | | 0–100 | 0–100 | |
| DR | <.02 | | 0–100 | 0–100 | |
| LR | .02–.10 | | 0–100 | 0–100 | |
| LR | .10–.25 | | >10 | 75–100 | |
| MR | .10–.25 | | <=10 | 0–100 | >=0 |
| TR | .10–.25 | | <=10 | 0–100 | <0 |
| MR | .10–.25 | | >10 | 0–75 | >=0 |
| TR | .10–.25 | | >10 | 0–75 | <0 |
| HR | >.25 | | <=10 | 0–100 | >=0 |
| THS | >.25 | | <=10 | 0–100 | <0 |
| MR | >.25 | | >10 | 75–100 | >=0 |
| TR | >.25 | | >10 | 75–100 | <0 |
| HR | >.25 | | >10 | 0–75 | >=0 |
| THS | >.25 | | >10 | 0–75 | <0 |

-continued

| Wx | Rain Amount (in) | Snow Amount (in) | Duration % | Density % | Lifted Index |
|---|---|---|---|---|---|
| FL | | <.10 | 0–100 | 0–100 | |
| LS | | .10–.25 | 0–100 | 0–100 | |
| LS | | .25–1.0 | <=10 | 0–100 | |
| LS | | .25–1.0 | >10 | 75–100 | |
| MS | | .25–1.0 | >10 | 0–75 | |
| MS | | 1.0–3.0 | <=10 | 0–100 | |
| MS | | 1.0–3.0 | >10 | 0–100 | |
| HS | | 3.0–5.0 | 0–100 | 0–100 | |
| BL | | >5.0 | 0–100 | 0–100 | |

Wind direction parameters may be derived from the U and V wind components of the output forecast grids of the selected model. An average of the wind directions for all forecast intervals is computed to derive a forecast period wind direction forecast.

Wind speed parameters may be derived from the U and V wind components of the output forecast grids of the selected model. An average of the wind speeds for all forecast intervals is computed to derive a forecast period wind speed forecast.

If more than 75% of the forecast intervals making up the forecast period have a relative humidity greater than 93% and the wind speed is less than 3 MPH, then it is considered foggy.

If the wind speed of all forecast intervals averaged over the forecast period is greater than 20 MPH, then it is considered windy.

Multiple views of a selected location for which a weather forecast has been generated may be available in the graphics/video database 17. In such case, the operator may select which particular view of the location is to be used in the forecast weather video presentation. The operator may also select whether or not background 72 or foreground 74 insert video segment layers are to be included in the combined forecast weather video presentation. These selections 70, 72, 74 may be made manually each time a forecast weather video presentation is generated, or automatically based on the occurrence of pre-selected conditions.

Based on the operator's selections 62, 64, 70, 72, 74, and the derived weather forecast parameters 68, video segments forming each layer of the combined forecast weather video presentation are selected from the graphics/video database 17. As discussed above, the background cloud layer video segment 38 may be selected based upon the time of day of the forecast, sky conditions (e.g. cloud level, cloud type), precipitation (e.g., thunderstorms or severe thunderstorms), and wind conditions. A background insert layer video segment 40 is incorporated in the composite forecast weather video presentation if a background insert layer video segment is selected at 72. A location view layer video segment 42 is selected based on the particular location view selected by an operator 70, and the time of day of the forecast weather video presentation and forecast sky conditions (which effect the appropriate lighting conditions for the locations presented in the location view video segment layer 42). A foreground insert layer video segment 44 is selected to be incorporated in the combined forecast weather video presentation if such a foreground insert layer video segment is selected by an operator at 74. A precipitation layer video segment 46 is selected based upon forecast precipitation and wind parameters. A fog layer video segment preferably is selected only if a determination is made at 76 that fog is forecasted for the particular location and time period which is the subject of the forecast weather video presentation. The time of day of the forecast weather video presentation may also be considered in selecting the fog layer video segment. Each of the video segment layers selected in this manner are combined at 78, using a conventional rendering process or product.

As discussed above, a computer generated graphics overlay may also be generated and combined with the video segment layers forming the combined forecast weather video presentation, e.g., as an overlay thereon. The graphics overlay 80 may included graphical and/or textual representations of information related to the forecast weather video presentation, e.g., indicating the time period represented by the presentation, forecast high and/or low temperatures for the time period represented in the presentation, forecasted wind speed and/or direction, etc.

After the combined forecast weather video presentation has been generated, it may be displayed, e.g., on a system output device 14 display screen, for review 82 by a meteorologist or operator of the system 10. If the combined forecast weather video presentation appears accurate, e.g., the meteorologist, based on his experience and knowledge of weather forecasting, believes that the automatically generated forecast weather video presentation represents accurately forecast weather conditions, the forecast weather video presentation may be broadcast, by the broadcast system 22, or otherwise displayed or saved, e.g., in the video presentation database 24, for a later use as part of a broadcast weather report.

Figure 5:
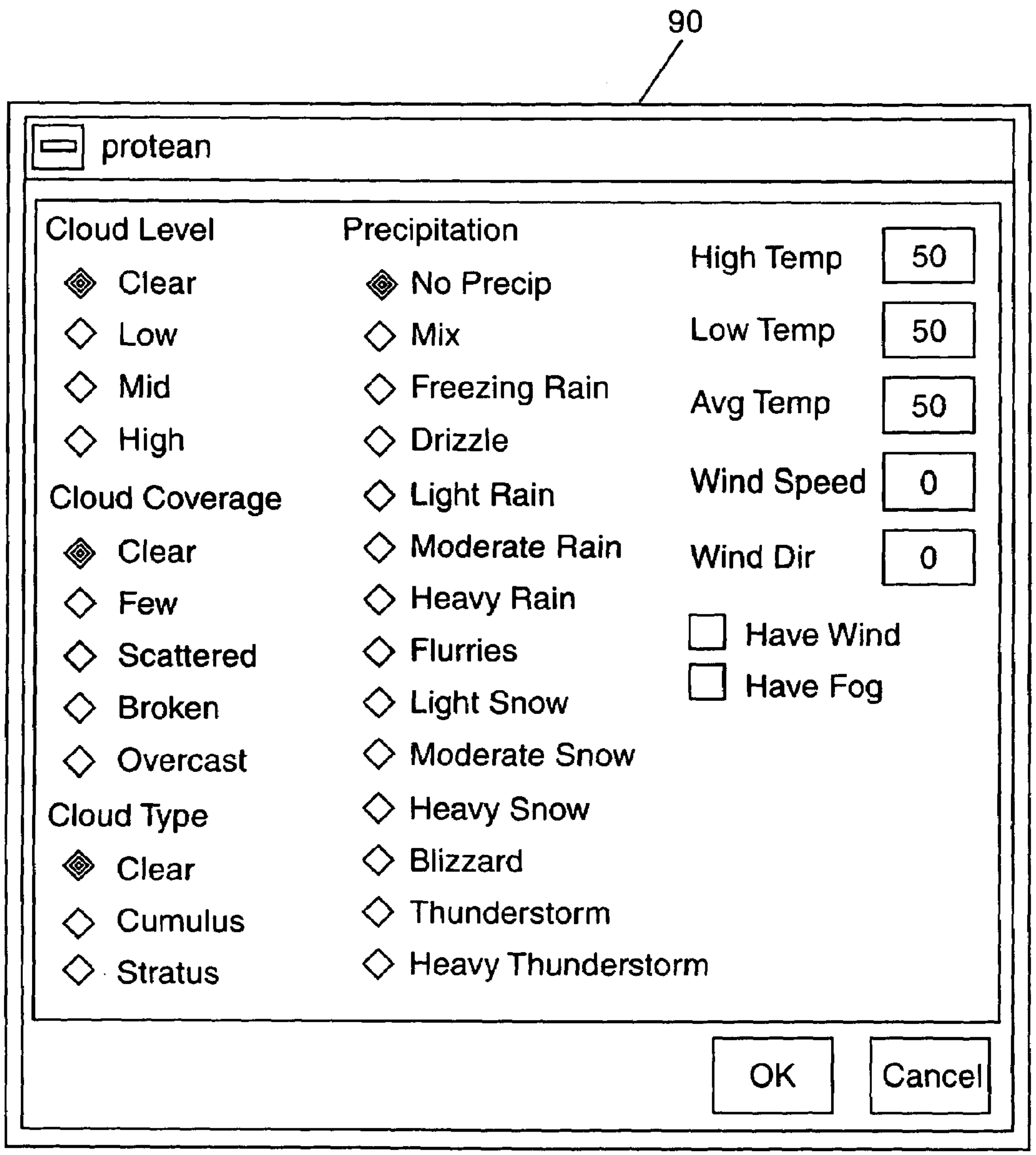
FIG. 5 is an exemplary graphical user interface which may be provided by a system for generating a forecast weather video presentation in accordance with the present invention to allow an operator thereof manually to override or select weather forecast parameters used to generate the forecast weather video presentation.

In accordance with the present invention, a meteorologist or other operator of the system 10 is preferably able to override manually selected weather parameters which may be derived automatically from the weather forecasting model 20. An exemplary graphical user interface 90, which may be presented on the system output device 14, and which allows the operator to use the system input device 13 manually to override or manually to select selected forecast parameters used in selecting automatically the video segments used to form a combined forecast weather video presentation in accordance with the present invention is illustrated at 90 in FIG. 5. Thus, although a forecast weather video presentation in accordance with the present invention may be generated automatically based on weather forecasting model data, a meteorologist or other operator may, based on experience or other factors, override the model derived forecast parameters, or select those parameters initially, thereby effectively to indirectly manually select the video segments which will be combined into the forecast weather video presentation.

It should be understood that the present invention is not limited to the particular exemplary applications and embodiments thereof as illustrated and described herein, but embraces such modified forms thereof has come within the scope of the following claims.

What is claimed is:

1. A method for generating a video presentation of forecast weather conditions, comprising:

(a) selecting a forecast location and forecast time period;

(b) obtaining forecast weather condition model data for the forecast location for a plurality of forecast intervals throughout the forecast time period;

(c) automatically determining a single weather forecast for the forecast time period from the forecast weather condition model data for the plurality of forecast intervals;

(d) selecting a location view video of the selected forecast location including a sky portion thereof;

(e) automatically selecting a weather condition video corresponding to the single weather forecast from among a plurality of pre-generated weather condition videos; and (f) combining the selected location view video and the selected weather condition video into a combined video presentation of forecast weather conditions wherein at least a portion of the selected weather condition video appears as the sky portion of the selected location view video.

2. The method of claim 1 wherein obtaining forecast weather condition model data includes generating automatically forecast weather condition model data for the plurality of forecast intervals throughout the forecast time period using a weather forecasting model.

3. The method of claims 1 comprising additionally manually adjusting the single weather forecast and automatically selecting a weather condition video based on the manually adjusted single weather forecast.

4. The method of claim 1 wherein selecting a location view video includes selecting automatically a location view video based on the selected location and forecast time period.

5. The method of claim 4 wherein selecting a location view video includes selecting automatically a location view video based additionally on the single weather forecast.

6. The method of claim 1 wherein automatically selecting a weather condition video includes automatically selecting a background weather condition video showing sky conditions corresponding to the single weather forecast from among a plurality of pre-generated background weather condition videos and automatically selecting a precipitation video showing precipitation corresponding to the single weather forecast and wherein combining the selected location view video and the weather condition video into a combined video presentation of forecast weather conditions includes combining the selected location view video, the selected background weather condition video, and the selected precipitation video into a combined video presentation wherein at least a portion of the background weather condition video appears as the sky portion of the location view video and the precipitation shown in the precipitation video appears in front of both the location view video and the sky conditions shown in the background weather condition video.

7. The method of claim 6 wherein at least one of the pre-generated background weather condition videos includes recorded video images of real sky conditions.

8. The method of claim 6 wherein at least one of the pre-generated background weather condition videos includes computer generated video images of sky conditions.

9. The method of claim 6 wherein selecting a precipitation video includes selecting a precipitation video from among a plurality of pre-generated computer generated video images of precipitation.

10. The method of claim 6 wherein automatically determining a single weather forecast includes automatically determining from the forecast weather condition model data for the plurality of forecast intervals whether fog is forecast for the selected forecast location and forecast time period, wherein automatically selecting a weather condition video includes automatically selecting a fog video showing fog corresponding to whether fog is forecast for the selected forecast location and forecast time period, and wherein combining the selected location view video and the selected weather condition video includes combining the selected fog video with the selected location view video, the selected background weather condition video, and the selected precipitation video into a combined video presentation wherein the fog shown in the selected fog video appears in front of the precipitation shown in the precipitation video and the location view video and wherein the precipitation shown in the precipitation video and the location view video are visible through the fog shown in the fog video.

11. The method of claim 6 comprising additionally selecting a background insert video showing background insert objects and combining the selected background insert video with the selected location view video, the selected background weather condition video, and the precipitation video into a combined video presentation wherein the background insert objects shown in the background insert video appear in front of the sky conditions shown in the background weather condition video and behind the location view video.

12. The method of claim 6 comprising additionally selecting a foreground insert video showing foreground insert objects and combining the selected foreground insert video with the selected location view video, the selected background weather condition video, and the precipitation video into a combined video presentation wherein the foreground insert objects shown in the foreground weather condition video appear in front of the location view video and behind the precipitation shown in the precipitation video.

13. A method for generating a video presentation of forecast weather conditions, comprising:

(a) selecting a forecast location and forecast time period;

(b) obtaining forecast weather condition model data for the forecast location for a plurality of forecast intervals throughout the forecast time period;

(c) automatically determining a single cloud forecast for the forecast time period from the forecast weather condition model data for the plurality of forecast intervals;

(d) selecting a location view video of the selected forecast location;

(e) automatically selecting a background weather condition video showing sky conditions corresponding to the single cloud forecast; and (f) combining the selected location view video and the selected background weather condition video into a combined video of forecast weather conditions wherein at least a portion of the selected background weather condition video appears as the sky portion of the selected location view video.

14. The method of claim 13 comprising additionally:

(a) automatically determining a single precipitation forecast for the forecast time period from the forecast weather condition model data for the plurality of forecast intervals;

(b) automatically selecting a precipitation video showing precipitation corresponding to the single precipitation forecast; and (c) combining the selected precipitation video with the selected location view video and the selected background weather condition video into the combined video of forecast weather conditions wherein the precipitation shown in the precipitation video appears in front of both the location view video and the sky conditions shown in the background weather condition video.

15. An apparatus for generating a video presentation of forecast weather conditions, comprising:

(a) a weather database including forecast weather condition model data for a forecast location for a plurality of forecast intervals throughout a forecast time period;

(b) a video database including a plurality of location view videos including sky portions thereof and a plurality of weather condition videos;

(c) an output display device; and (d) a system processor coupled to the weather database, to the video database, and to the output display device and adapted to determine automatically a single weather forecast for the forecast time period from the forecast weather condition model data for the plurality of forecast intervals in the weather database, to select a location view video of the forecast location from the video database, to select a weather condition video corresponding to the single weather forecast from the video database, to combine the selected location view video and the selected weather condition video into a combined video presentation of forecast weather conditions wherein at least a portion of the selected weather condition video appears as the sky portion of the selected location view video, and to display the combined video presentation on the output display device.

16. The apparatus of claim 15 comprising additionally a weather forecasting model adapted to generate the forecast weather condition model data for the forecast location for a plurality of forecast intervals throughout the forecast time period as stored in the weather database.

17. The apparatus of claim 15 comprising additionally a user input device and wherein the system processor is coupled to the user input device and adapted to receive from the user input device manual adjustments to the single weather forecast and to select the weather condition video from the video database based on the manually adjusted single weather forecast.

18. The apparatus of claim 15 wherein the system processor is adapted to select the location view video from the video database based on the single weather forecast.

19. The apparatus of claim 15 wherein the system processor is adapted to determine a single cloud forecast for the forecast time period from the forecast weather condition model data for the plurality of forecast intervals in the weather database, to select a weather condition video showing sky conditions corresponding to the single cloud forecast from the video database, and to combine the selected location view video and the selected weather condition video into the combined video of forecast weather conditions wherein at least a portion of the selected weather condition video appears as the sky portion of the selected location view video.

20. The apparatus of claim 19 wherein the system processor is adapted to determine a single precipitation forecast for the forecast time period from the forecast weather condition model data for the plurality of forecast intervals in the weather database, to select a weather condition video showing precipitation corresponding to the single precipitation forecast from the video database, and to combine the selected weather condition video showing precipitation with the selected weather condition video showing sky conditions and with the selected location view video into the combined video of forecast weather conditions wherein the precipitation shown in the selected weather condition video showing precipitation appears in front of both the location view video and the sky conditions shown in the selected weather condition video showing sky conditions.

* * * * *